3,407,627
ELASTIC COUPLING FOR HIGH
DYNAMIC STRESSES
Horst Lätsch, Horst Meusel, and Eckhardt Nagel, Gotha, Germany, assignors to VEB Getriebewerk Gotha, Gotha, Germany
Filed Jan. 23, 1967, Ser. No. 610,989
6 Claims. (Cl. 64—11)

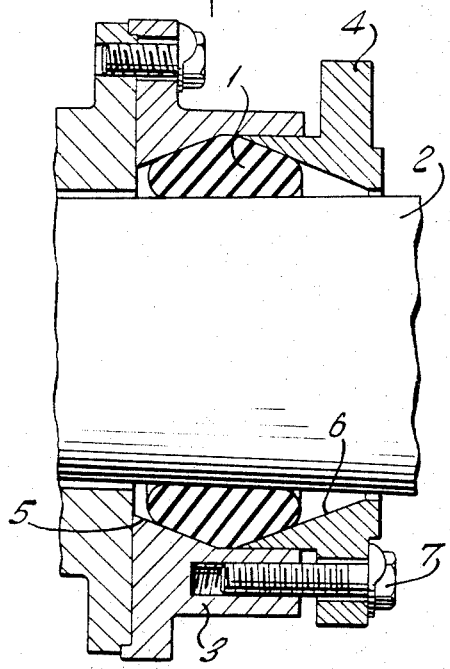
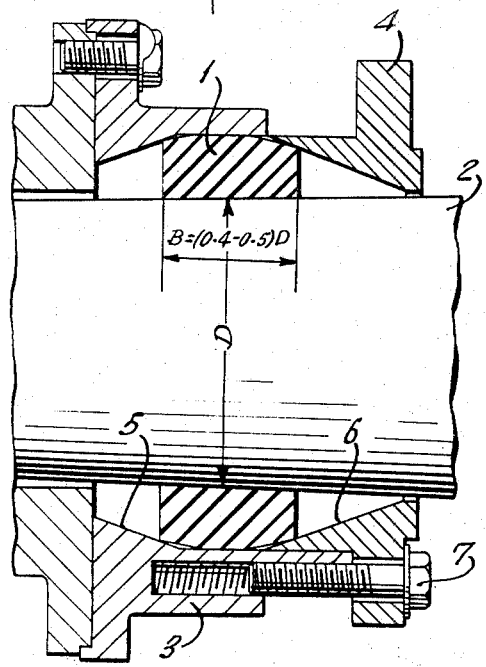
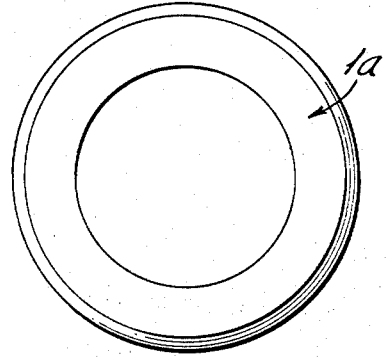
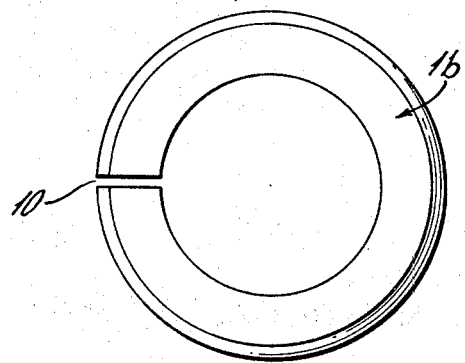
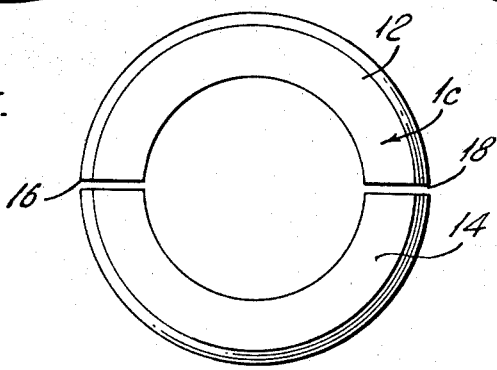
INVENTORS
HORST LÄTSCH
HORST MEUSEL
ECKHARDT NAGEL

United States Patent Office 3,407,627
Patented Oct. 29, 1968

ABSTRACT OF THE DISCLOSURE

An elastic coupling device for transmitting a turning moment between a structure to be mounted on a shaft and the shaft, wherein an elastic ring, having opposing frustoconical exterior surfaces, surrounds the shaft. A coupling member and a compression member, slidably movable in said coupling member, have interior annular frustoconical surfaces with an angle of inclination which is greater than the angle of inclination of the frustoconical exterior surfaces of the ring. Said interior annular frustoconical surfaces engage said exterior surfaces and compress said ring when said compression member is slidably moved in the direction of said coupling member thereby forcing the interior surface of the ring to engage the shaft.

---

The present invention relates to couplings.

More particularly, the present invention relates to couplings which are required to connect transmissions and the like to shafts with the coupling having an elastic construction and functioning not only to transmit a given turning moment but also to withstand high dynamic stresses.

It is a primary object of the present invention to provide a coupling of this general type wherein a pair of outer elements of the coupling surround the shaft of the coupling and an elastic ring is situated between these coupling elements and the shaft in such a way that this latter ring, which is made of a highly elastic material, is not prevented from rotating while at the same time it is axially prestressed by way of wedge-shaped elements which may be conical or frustoconical.

There are known constructions of this latter general type where individual rubber elements are respectively pressed by radial screws against the shaft. This construction is, however, very expensive since each individual rubber element requires its own pressing unit.

It is also known to press rubber rings into annular chambers whose inner limit is formed by the shaft itself, while a radial force is achieved within the body of the rubber ring itself by providing axial pressure thereon so that the transmission of power between the shaft and the coupling elements will take place. This type of construction has the disadvantage, however, of compressing the rubber into all of the gaps, after a period of time, so that after relatively short intervals additional adjustments are required and the rubber ring itself has only a short life. Inasmuch as the elastic properties of the rubber itself are not made use of, the required pressure is high, so that even at relatively low temperatures, for example on the order of —40° C., the required stress in the rubber will be maintained. As a result this type of construction also requires a very expensive structure.

It is thus a primary object of the present invention to provide a coupling which will avoid the above drawbacks while at the same time providing an elastic coupling capable not only of fixing a drive to a shaft but also of transmitting a turning movement to and from the shaft.

Thus, it is one of the more specific objects of the present invention to provide a coupling of the above general type which is relatively inexpensive and simple.

Also, it is an object of the present invention to provide a construction of the above type which will have a long, useful life.

Furthermore, it is an object of the present invention to provide a coupling structure capable of being mounted on a normal shaft, without any special working required for this purpose, particularly a construction which is capable of being mounted on the shafts of railway cars.

In accordance with the present invention, the structure includes a shaft and a ring of highly elastic material, preferably rubber, surrounding the shaft, this ring in its unstressed condition having between its end faces a width on the order of 0.4–0.5 times its inner diameter while at its exterior the ring has next to said end faces thereof a pair of oppositely inclined frustoconical surfaces which have smaller diameters at the end faces than intermediate the end faces and which respectively form parts of a pair of cones whose apex angles are on the order of 20° and are situated at the axis of the shaft. In order to compress the ring against the shaft a coupling part is provided surrounding the ring and extending inwardly over the latter from one of the end faces thereof, while a compression member extends inwardly over the ring from the other of the end faces thereof, and the compression member is axially guided by the coupling member while a means is provided for pulling the compression member toward the coupling member so as to compress the ring between the shaft, on the one hand, and the inner surfaces of the coupling member and compression ring which engage the exterior surfaces of the ring. These inner surfaces are also of a frustoconical configuration and respectively engage the frustoconical surfaces at the exterior of the rubber ring, but these surfaces at the interior of the coupling member and compression member respectively form parts of cones whose apex angles are on the order of 40° and situated at the shaft axis, with the direction inclination of the frustoconical inner annular surfaces of the coupling member and compression member being the same as the direction of inclination of the opposed frustoconical surfaces at the exterior of the rubber ring.

The invention is illustrated by way of example in the accompanying drawings which form part of this application and in which:

FIG. 1 is a partly schematic sectional elevation, taken in a plane which includes the axis of the shaft and illustrating the details of one possible embodiment of a coupling structure according to the present invention;

FIG. 2 shows the parts in the condition where the elastic coupling ring is unstressed;

FIG. 3 shows in an end elevation one possible embodiment of an elastic ring according to the invention;

FIG. 4 is an end elevation of another embodiment of an elastic ring according to the invention; and FIG. 5 is an end elevation of a still further embodiment of an elastic ring according to the invention.

Thus, referring to the drawings, it will be seen that the shaft 2 is surrounded and engaged by a ring 1 which is highly elastic and preferably made of rubber, this ring preferably being formed with axial slits at least along its inner periphery and being pushed into the illustrated position between the shaft 2 and the coupling member 3. The coupling member 3 forms an outer coupling member which is connected, as by any suitable bolts or the like, to the structure which is to be mounted on the shaft, as indicated at the upper left portion of FIG. 1. A compression ring 4 has, surrounding the ring 1, a portion of a cylindrical exterior surface and an inner frustoconical surface, while the coupling member 3 has, overlapping the compression member 4, an inner cylindrical surface slidably engaging the outer cylindrical surface of the ring 4 at the place where it surrounds the ring 1, so that in this way the ring 4 is guided by the coupling member 3 for axial movement.

The coupling member 3 has an inner frustoconical surface 5 while the compression member 4 has an inner frustoconical surface 6, and these frustoconical surfaces are oppositely directed but of the same degree of inclination. Actually it has been found best to make each of the surfaces 5 and 6 part of a cone whose apex angle is on the order of 40° and situated at the axis of the shaft 2.

A means is provided for pulling the ring 4 to the left, as viewed in FIG. 1, toward the end face of the ring 1 beyond which the coupling member 3 extends. In the illustrated example this means takes the form of a plurality of bolts 7 passing freely through openings in an outer flange of the compression member 4 and threaded into axial tapped bores which are formed in the member 3 in suitable bosses which project from the exterior thereof. Thus, the ring 3 appears thicker at the bottom of FIG. 1 than at the top of FIG. 1 because the section at the bottom of FIG. 1 goes through one of these elongated bosses which is formed with the threaded bore which receives the bolt 7 shown at the lower part of FIG. 1.

It is furthermore to be noted that the inner annular frustoconical surfaces of the coupling elements 3 and 4, namely the surfaces 5 and 6 thereof, respectively, define with the exterior of the shaft 2 a space into which the opposed end faces of the ring 1 can freely expand without engaging any other elements.

The ring 1 is preferably made of rubber and, as is indicated in FIG. 2, where the ring 1 is shown in its unstressed condition, the ring 1 has between its end faces a width B which is on the order of 0.4–0.5 times the inner diameter D of the ring 1. The screw 7 is shown in FIG. 2 threaded outwardly of the bore of the member 3 so that the ring 1 can be illustrated in its unstressed condition, and the extent to which the screw is axially advanced during tightening thereof is indicated by the dimension which is shown at the lower part of FIG. 2.

It will be noted from FIG. 2 that the ring 1 has at its exterior surface next to its opposed end faces a pair of oppositely inclined frustoconical surface portions which respectively have at the end faces of the ring smaller diameters than between these end faces, and these oppositely inclined frustoconical surface portions of the ring 1 respectively form parts of cones having apex angles on the order of 20° and situated with their apexes also in the axis of the shaft 2. Thus, the extent of inclination of the annular surfaces 5 and 6 is twice the extent of inclination of the annular frustoconical surfaces at the exterior of the rubber ring 1, while the directions of inclination of surfaces 5 and 6 are respectively the same as those of the frustoconical surfaces of ring 1.

Of course, when these screws 7, one of which is shown in FIG. 2, and which may be uniformly distributed about the shaft 2, are threaded into the bores of the coupling member 3, the exterior cylindrical surface of the compression member 4, to the left of the flange thereof as viewed in FIG. 2, will enter slidably into the right cylindrical portion of the compression member 3 so as to compress the ring 1 until it has the configuration in cross section which is apparent from FIG. 1.

When in this condition the ring 1 is capable of transmitting turning moments between the structure connected to the coupling member 3 and the shaft 2 as well as capable of being subjected to very high dynamic stresses while at the same time having a long operating life. Moreover, it will be noted that the structure of the invention is exceedingly rugged and simple.

As may be seen from FIG. 3, the ring 1 may have the construction 1a according to which this ring is in the form of a continuous solid, endless ring.

FIG. 4 shows an embodiment where the ring 1 has the construction of the ring 1b shown in FIG. 4. According to this embodiment the ring is formed with a single slot 10 passing through the ring so that when it is mounted around the shaft 2 the slot 10 will be closed.

Also, the ring 1 may have the construction shown for the ring 1c in FIG. 5, according to which the ring is made of a pair of semi-circular sections 12 and 14 which define between themselves the slots 16 and 18 which, of course, become closed during compression of the ring.

What is claimed is:

1. An elastic coupling for high dynamic stresses, comprising a shaft, a highly elastic ring surrounding and engaging said shaft, said ring having a pair of opposed end faces and having a width between said end faces on the order of 0.4–0.5 times the inner diameter of said ring, and said ring having at its exterior surfaces next to said opposed end faces thereof a pair of oppositely inclined frustoconical surfaces which respectively have at said end faces smaller diameters than at locations situated between said end faces, and each of said frustoconical surfaces forming part of a cone whose apex coincides with the axis of said shaft and whose apex has an angle on the order of 20°, an outer coupling member surrounding and engaging said ring and extending inwardly around the latter from one of said end faces, a compression member surrounding and engaging said ring and extending inwardly beyond the end face thereof which is opposite from that end face where said coupling member is located, and means operatively connected with said coupling member and compression member for axially advancing the latter toward said coupling member to compress the ring between said coupling member, compression member, and said shaft, said coupling member and compression member respectively having directed toward and engaging said frustoconical surfaces of said ring inner annular surfaces which also are of a frustoconical configuration and which are respectively inclined in the same directions as said frustoconical surfaces of said ring, and said frustoconical inner surfaces of said coupling member and compression member each forming part of a cone whose apex angle is on the order of 40° and whose apex is also situated in the axis of said shaft.

2. The combination of claim 1 and wherein said ring is made of rubber.

3. The combination of claim 1 and wherein said compression member is slidably guided by said coupling member, the latter having an outer peripheral portion in the region of and surrounding said compression member and slidably engaging the latter.

4. The combination of claim 1 and wherein said coupling member and compression member are situated outwardly beyond said end faces of said ring and define with said shaft spaces into which said ring may freely expand during compression thereof.

5. The combination of claim 1 and wherein said ring is formed with axial slits.

6. The combination of claim 5 and wherein said ring has portions of predetermined radii and inclinations as required for the high dynamic stresses of the elastic coupling.

References Cited

UNITED STATES PATENTS

| | | | |
|---|---|---|---|
| 2,460,628 | 2/1949 | Fawick | 64—27 X |
| 2,562,359 | 7/1951 | Iredell | 64—27 X |
| 2,716,873 | 9/1955 | Byers | 64—11 |
| 3,165,065 | 1/1965 | Stickel | 64—11 X |
| 3,232,076 | 2/1966 | Sundt | 64—11 |

HALL C. COE, *Primary Examiner.*